(12) United States Patent
Luo (10) Patent No.: US 11,814,858 B2
(45) Date of Patent: Nov. 14, 2023

(54) MOVABLE UMBRELLA BASE

(71) Applicant: Xiong Luo, Nantong (CN)

(72) Inventor: Xiong Luo, Nantong (CN)

(*) Notice: Subject to any disclaimer, the term of this patent is extended or adjusted under 35 U.S.C. 154(b) by 110 days.

(21) Appl. No.: 17/595,342

(22) PCT Filed: Jul. 23, 2019

(86) PCT No.: PCT/CN2019/097180
§ 371 (c)(1),
(2) Date: Nov. 15, 2021

(87) PCT Pub. No.: WO2020/244036
PCT Pub. Date: Dec. 10, 2020

(65) Prior Publication Data
US 2022/0195749 A1  Jun. 23, 2022

(30) Foreign Application Priority Data
Jun. 6, 2019  (CN) .......................... 201910490459.7

(51) Int. Cl.
*E04H 12/22* (2006.01)
*B60B 33/00* (2006.01)
(Continued)

(52) U.S. Cl.
CPC ..... *E04H 12/2238* (2013.01); *B60B 33/0089* (2013.01); *B60B 33/06* (2013.01);
(Continued)

(58) Field of Classification Search
CPC ............... E04H 12/2238; A45B 23/00; A45B 2023/0006; A45B 2023/0012; B65G 7/06;
(Continued)

(56) References Cited

U.S. PATENT DOCUMENTS 2,671,242 A * 3/1954 Lewis ..................... B60B 33/08
280/43.23
2,673,065 A * 3/1954 Patterson ................ B66F 3/247
405/196

(Continued)

FOREIGN PATENT DOCUMENTS

CH           667078 A5 * 9/1988  ................ B66F 3/35
CN        110028009 A  * 7/2019  ................ B66F 3/25
(Continued)

*Primary Examiner* — Taylor Morris
(74) *Attorney, Agent, or Firm* — Wang Law Firm, Inc.

(57) ABSTRACT

A movable umbrella base comprises a housing (1), a wheel frame (2) disposed under the bottom of the housing (1), at least three wheels (3) connected at intervals to the wheel frame (2) and located partially under the wheel frame (2), a plurality of air bags (4) located inside a space defined by the wheel frame (2) and the housing (1), and a plurality of elastic members (6) limit displacement of the wheel frame (2) and the wheels (3) from the housing (1); when the air bags (4) are inflated, the housing (1) is lifted up relative to the wheel frame (2) and the wheels (3) from the ground; when the air bags (4) are deflated, the housing (1) is lowered relative to the wheel frame (2) and the wheels (3) and contacts the ground. The umbrella base can be moved by the air bags (4), the whole operation process is easier, and it saves more time and effort.

4 Claims, 6 Drawing Sheets (51) Int. Cl.
*B60B 33/06* (2006.01)
*B66F 3/24* (2006.01)
*B66F 3/35* (2006.01)
*A45B 23/00* (2006.01)

(52) U.S. Cl.
CPC .............. *B66F 3/247* (2013.01); *B66F 3/35* (2013.01); *A45B 2023/0012* (2013.01)

(58) Field of Classification Search
CPC . B60B 33/0089; B60B 33/0094; B60B 33/06; F16M 11/42; F16M 2200/08; B66F 3/35; B66F 3/247; A61G 7/1021
See application file for complete search history.

(56) References Cited

U.S. PATENT DOCUMENTS

| | | | | |
|---|---|---|---|---|
| 3,185,238 A | * | 5/1965 | Coates | B66F 3/35 180/125 |
| 3,213,993 A | * | 10/1965 | Long | B60P 1/6427 198/774.2 |
| 3,237,722 A | * | 3/1966 | Citroen | B66F 3/35 187/213 |
| 3,669,292 A | * | 6/1972 | Tuura | B66F 9/18 254/2 B |
| 3,758,918 A | * | 9/1973 | Bruun | B60B 33/0089 182/15 |
| 3,822,761 A | * | 7/1974 | Vaughen | A47C 27/082 180/125 |
| 4,275,869 A | * | 6/1981 | Clements | B66F 3/35 254/93 HP |
| 4,436,303 A | * | 3/1984 | McKillip | B60B 33/0089 280/43.24 |
| 4,518,151 A | * | 5/1985 | Dill, Jr. | B65G 59/00 414/789.5 |
| 6,594,951 B1 | * | 7/2003 | Reynolds | A47G 7/041 47/39 |
| 6,929,249 B1 | * | 8/2005 | Kim | B66F 3/35 254/93 H |
| 7,275,345 B2 | * | 10/2007 | Cosse, III | B62B 5/0083 280/79.5 |
| 8,302,934 B1 | * | 11/2012 | Woods | B66F 3/35 254/8 B |
| 9,511,787 B2 | * | 12/2016 | Muller | B62B 5/0083 |
| 10,934,144 B2 | * | 3/2021 | Dissing | B66F 3/35 |
| 2020/0002141 A1 | * | 1/2020 | Dissing | E04F 21/18 |

FOREIGN PATENT DOCUMENTS

| | | | | |
|---|---|---|---|---|
| CN | 215259008 U | * | 12/2021 | ............. A45B 25/00 |
| FR | 1282755 A | * | 1/1962 | ............. B30B 1/003 |
| FR | 1537095 A | * | 8/1968 | ................ B66F 3/35 |
| FR | 2571318 A1 | * | 4/1986 | ............ B60P 1/6427 |
| GB | 929920 A | * | 6/1963 | ........... A61G 1/0212 |
| GB | 1485752 A | * | 9/1977 | ............ B60P 1/6427 |
| WO | WO-2004112677 A1 | * | 12/2004 | ........... A61G 1/0212 |
| WO | WO-2022193937 A1 | * | 9/2022 | ............. A45B 25/00 |

* cited by examiner

MOVABLE UMBRELLA BASE

TECHNICAL FIELD OF THE INVENTION

The present invention relates to an umbrella base, in particular to a movable umbrella base.

BACKGROUND OF THE INVENTION

Umbrellas are widely used in squares, beaches, parks, courtyards and other leisure places, providing a comfortable space for people to enjoy the cool. Outdoor parasols are widely used in squares, beaches, parks, courtyards and other leisure places, providing people with comfortable cool space. However, due to the large area of a canopy when this large umbrella is unfolded, a support stem is usually fixed on an umbrella base to ensure the stability and balance of the umbrella in wind. Moreover, the existing umbrellas need to be equipped with an umbrella base heavy enough to prevent being tipped over by wind.

When the umbrella base is heavy enough with a large landing area, it is very inconvenient to move the umbrella base. In order to solve the above technical problem, there are umbrella bases with wheels on the market at present, which make the movement more convenient and easier. When the wheels are not needed, the wheels will be retracted at the bottom of the umbrella base and the umbrella base lands. When the wheels are needed, the wheels land after being pulled out by hand, so that the wheels can roll freely on the ground. However, when the wheels are hidden or pulled out, a manual operation is required, which is very laborious.

To solve the above technical problem, a Chinese utility model patent No. CN201513685U (Patent No. CN200920197251.8), titled "Movable Umbrella Base", comprises a housing, a base, a plurality of wheels connected in the base, and a linkage mechanism, a pedal and an inner eccentric ratchet. One of the wheels is a first wheel connected to the inner eccentric ratchet through a shackle rod, while other wheels are second wheels each connected to the first wheel through a connecting rod; and the pedal is hinged with the base and engaged with the inner eccentric ratchet. When the umbrella base need to be moved up to make the wheels work, the inner eccentric ratchet is driven to rotate at a certain angle by stepping on the pedal, so that a hinged joint between the inner eccentric ratchet and the shackle rod slowly moves away from a base frame to apply a downward force to the first wheel and an upward force to a wheel frame, forcing the umbrella base to move up from the ground. When the wheels need to be retracted, the wheel frame of the first wheel is driven to rotate inward around the hinged joint with the base frame still by stepping on the pedal, i.e., an upward force is applied to the first wheel, so that the umbrella base is forced to move down to approach the ground slowly under the action of its gravity until it is in full contact with the ground. According to this utility model, the wheels can move up and down by stepping on the pedal, which is labor-saving compared with pulling out the wheels by hand. However, a connecting structure of the pedal, the shackle rod, the inner eccentric ratchet and the base is complicated. At the same time, it is laborious for people to step on the pedal to move the wheels up and down.

Therefore, the existing movable umbrella bases need to be further improved.

SUMMARY OF THE INVENTION

It is an object of the present invention to provide a movable umbrella base having a simple and reasonable structure and wheels allowing easy and labor-saving lifting operations.

For achieving the object, the movable umbrella base comprises:
a housing having a bottom;
a wheel frame disposed under the bottom of the housing;
at least three wheels connected at intervals to the wheel frame and the at least three wheels located partially under the wheel frame;
wherein:
a plurality of air bags are located inside a space defined by the wheel frame and the housing; when the air bags are inflated, the housing is lifted up relative to the wheel frame and the wheels from the ground; when the air bags are deflated, the housing is lowered relative to the wheel frame and the wheels and contacts the ground;
a plurality of elastic members limit displacement of the wheel frame and the wheels from the housing to contact the ground when the air bags are deflated.

In order to facilitate inflation of the air bags, preferably, each air bag has an air pipe for air circulation, and each air pipe is exposed partially outside the wheel frame.

In order to inflate or deflate at least two air bags at the same time, preferably, the number of the air bags are at least two, the air pipes on the air bags are connected with each other by a connecting pipe, and the connecting pipe has a nozzle for communicating with an external inflator, the nozzle is exposed outside the wheel frame. The arrangement of the air bags, especially when there are at least two air bags, ensures that the wheel frame and the wheels move up and down stably, and the umbrella base is better in balance stability throughout the adjustment.

The wheel frame structure may be a triangular frame or a quadrilateral frame. Preferably, the wheel frame is a quadrilateral frame, and four wheels disposed at intervals at four corners at the bottom of the wheel frame. Such structure design makes the umbrella base move more freely.

Preferably, the wheel frame has a first frame plate and a second frame plate; two air bags disposed in parallel and at intervals, and disposed respectively on the first frame plate and the second frame plate; each air pipe extends downward, the first frame plate and the second frame plate respectively have a first hole and a second hole for the corresponding air pipe to extend outside; the air pipes of the two air bags are connected with each other by the connecting pipe located at the bottom of the wheel frame, the connecting pipe has the air nozzle, and the housing has a gap for allowing the air nozzle to be exposed.

To support the connecting pipe and avoid the connecting pipe from loosening or even falling off due to its own weight during long-term use, preferably, the wheel frame has a supporting member for supporting the connecting pipe at the bottom of the wheel frame The supporting member varies in shape, which may be U-shaped or L-shaped and may also be in other structural forms. Preferably, a third frame plate is connected between the first frame plate and the second frame plate, the supporting member is a U-shaped ring disposed at the bottom of the third frame plate, and the air nozzle extends out of the U-shaped ring from inside.

The wheel frame and the housing can be connected in various forms. for simple structure and low cost, preferably, the wheel frame and the housing respectively have four mounting holes for receiving four connecting pieces each of which has an extension rod; the housing has two inner plates; the extension rod of each connecting piece runs upward through the corresponding mounting hole of the wheel frame and the housing, so as to make the wheel frame be mounted on two inner plates of the housing.

The elastic members can be mounted in various forms, which may be located between the wheel frame and the housing or on the extension rod. Preferably, each connecting piece has an enlarged end at bottom of the extension rod, and the elastic member is a spring sleeved on each extension rod and disposed between the enlarged end and the wheel frame. The elastic members are provided on the extension rods to avoid interference to the deflation and inflation of the air bags and to make the entire structure simpler and more reasonable at the same time.

Preferably, each connecting piece is an adjusting bolt, and correspondingly, four threaded holes fitted to the adjusting bolts are disposed on the housing.

Compared with the prior art, the present invention has following advantages. The air bags are disposed between the wheel frame and the housing of the movable umbrella base, the wheel frame and the wheels will move down with respect to the housing during the inflation and deflation of the air bags, and when the bottom of the wheels is below the bottom of the housing, the wheels is grounded, thus allowing the displacement of the umbrella base. During the deflation of the air bags, the wheel frame and wheels will move up with respect to the housing, and when the wheels are hidden in the housing, the housing is grounded. In this case, the wheels 3 are off the ground to fix the umbrella base. The umbrella base can be moved through inflation and deflation of the air bags, so whole operation process is easier, and there is no need to the wheels can be moved up and down without an external force applied by hand or by foot, which saves more time and effort.

DETAILED DESCRIPTION OF THE INVENTION

The present invention will be further described in detail by embodiments with reference to the accompanying drawings.

As shown in FIGS. 1 to 8, a movable umbrella base is provided according to an embodiment of the present invention. The movable umbrella base comprises an housing 1, a wheel frame 2, a plurality of wheels 3, a plurality of elastic members 6 and a plurality of air bags 4.

The housing 1 has a socket 12 for receiving a column disposed on the top of the housing 1, and has two mounting grooves 13 for receiving the two air bags 4 disposed at the bottom of the housing 1.

Figure 1:
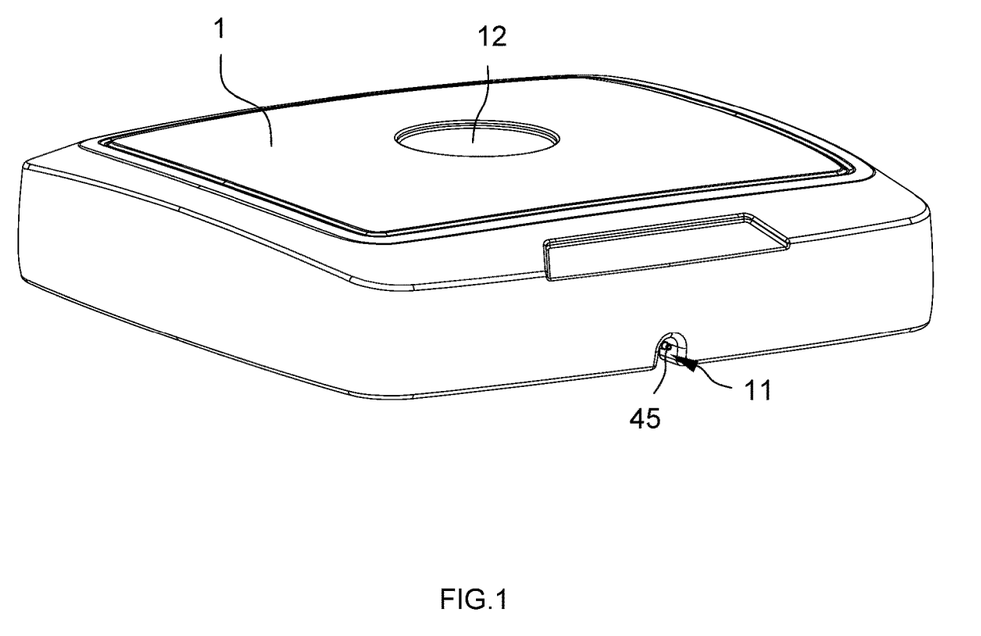
FIG. 1 is a perspective view of a movable umbrella base according to an embodiment of the present invention.
Figure 2:
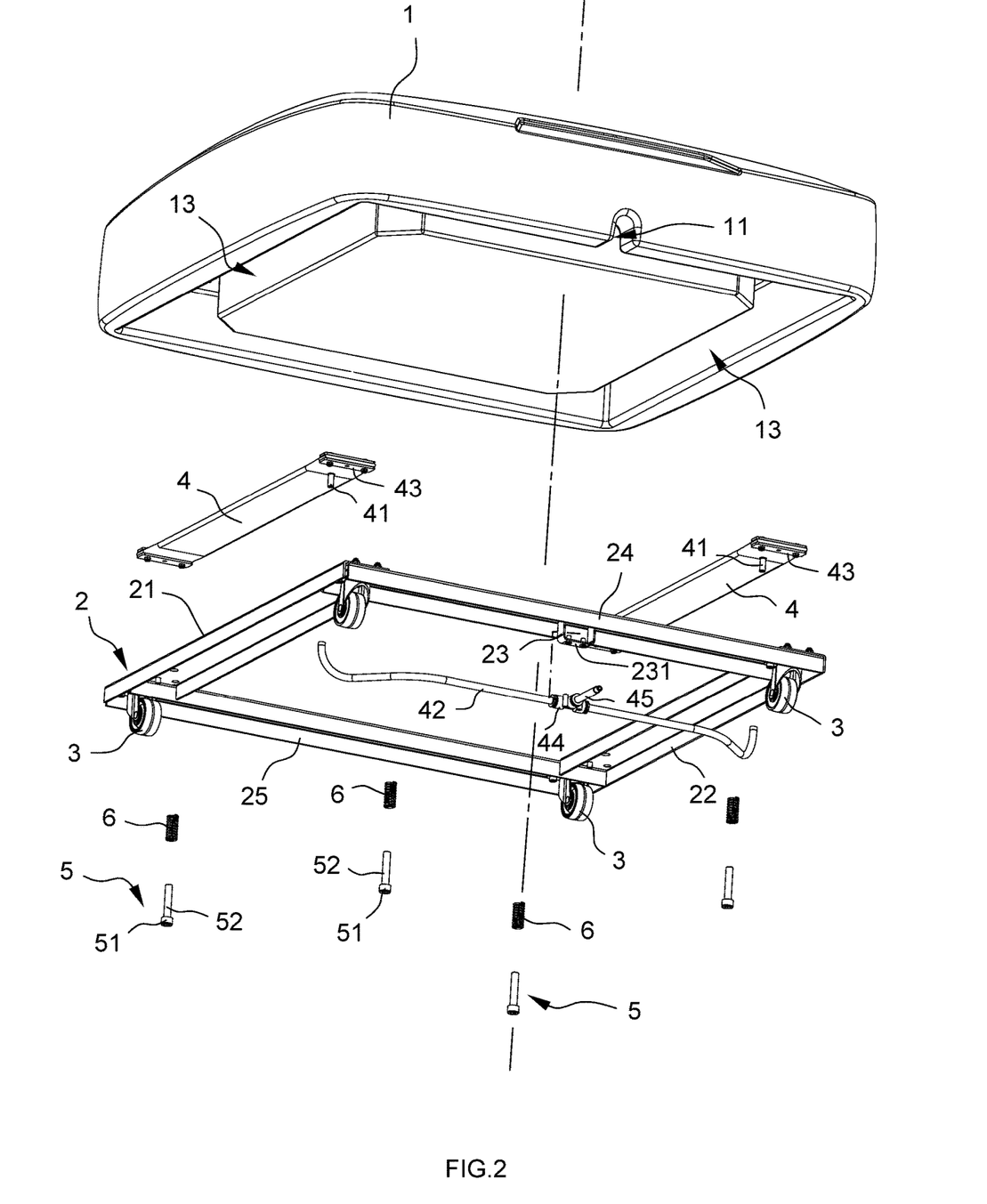
FIG. 2 is an exploded view of FIG. 1.
Figure 7:
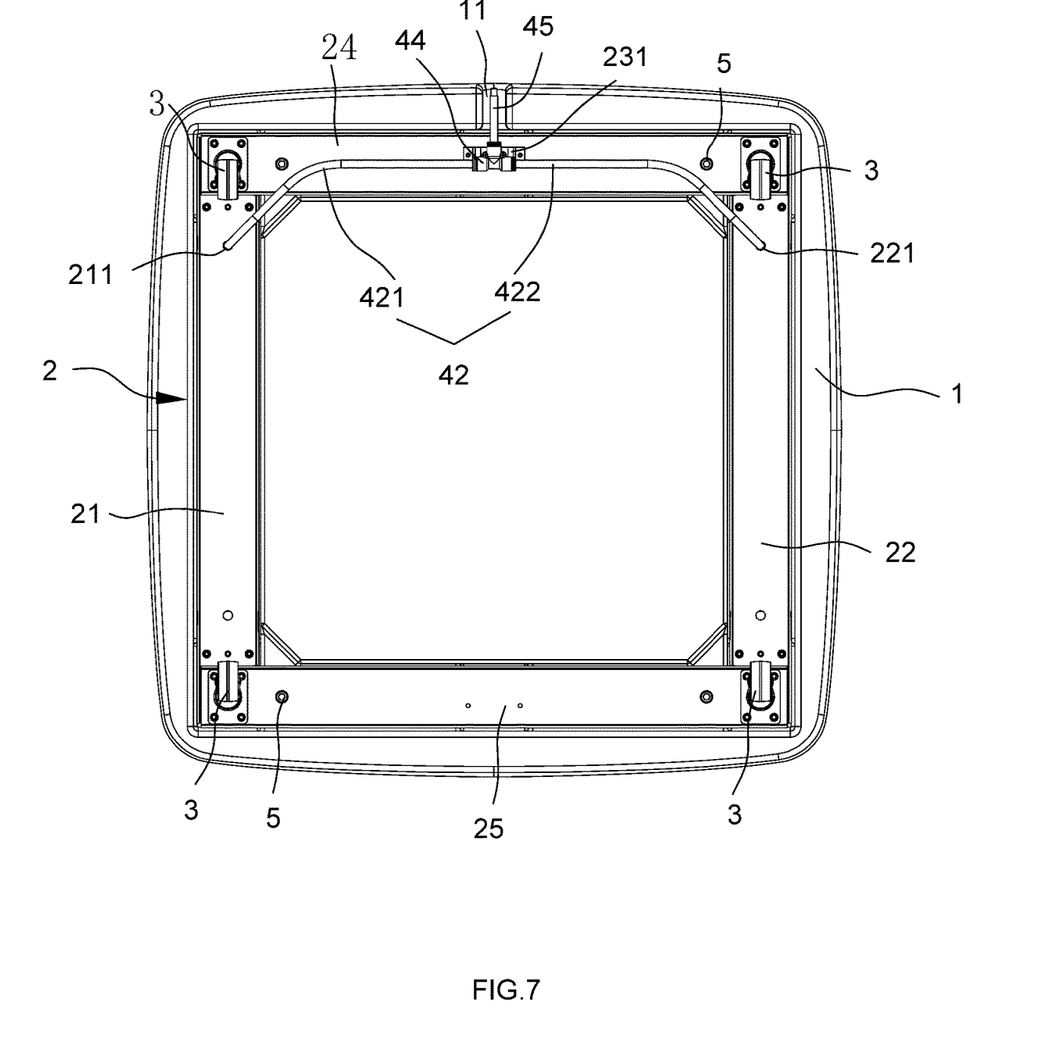
FIG. 7 is a perspective view of FIG. 1 from another bottom view.
Figure 8:
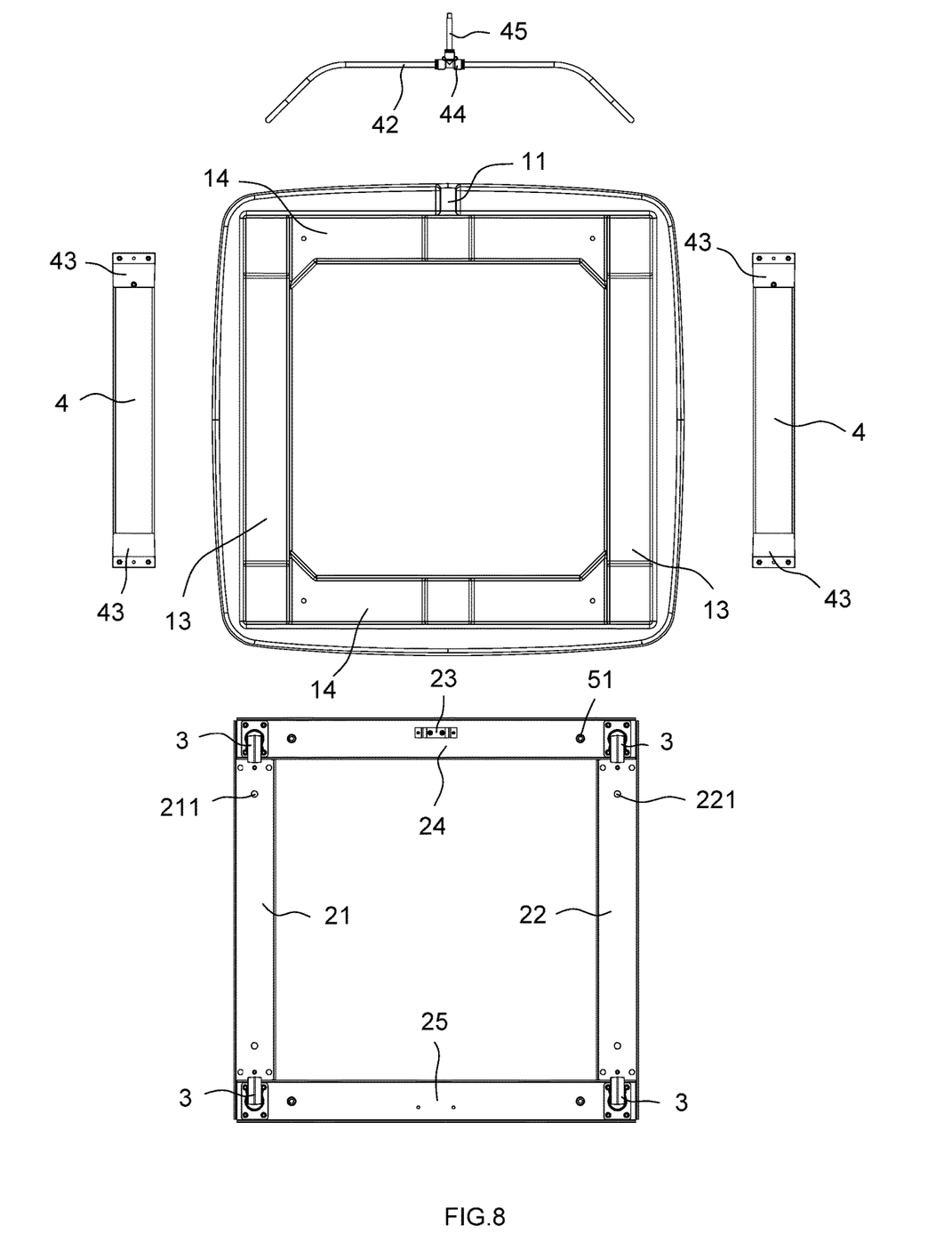
FIG. 8 is an exploded view of FIG. 7.

As shown in FIG. 2 and FIG. 7, the wheel frame 2 is a quadrilateral frame, and comprises a first frame plate 21 and a second frame plate 22 spaced in parallel, and a third frame plate 24 and a fourth frame plate 25 spaced in parallel for connecting the first frame plate 21 and the second frame plate 22. At least three wheels 3 are connected at intervals to the wheel frame 2 and the wheels 3 located partially under the wheel frame 2. In this embodiment, as shown in FIG. 1 and FIG. 2, there are four wheels 3 disposed at four corners of the bottom of the wheel frame 2, each wheel 3 is disposed at the bottom of the joint of two adjacent frame plates, and the wheels 3 in this embodiment are casters.

The wheel frame 2 is disposed under the bottom of the housing 1 and is mounted on the housing 1 by four connecting pieces 5, and the four connecting pieces 5 are circumferentially disposed at intervals around the wheel frame 2. Specifically, the third frame plate 24 of the wheel frame 2 is mounted at a proper position on the housing 1 by two connecting pieces 5 while the fourth frame plate 25 of the wheel frame 2 is mounted at a proper position on the housing 1 by the other two connecting pieces 5, and four mounting holes for receiving four connecting pieces 5 are correspondingly disposed on the third frame plate 24, the fourth frame plate 25 and two inner wall plates 14 of the housing 1. The inverted T-shaped connecting piece 5 has an extension rod 52 runs upward through the corresponding mounting hole of the wheel frame 2 and the housing 1, so as to make the wheel frame 2 be mounted on two inner plates 14 of the housing 1, and an enlarged end 51 is disposed at bottom of each extension rod 52. In this embodiment, each connecting piece 5 is an adjusting bolt, and correspondingly, four threaded holes fitted to the adjusting bolts are disposed on the housing 1, each adjusting bolt runs upward through the mounting hole on the wheel frame 2 and is threaded into the threaded hole of the housing 1, so that the wheel frame 2 and the housing 1 are mounted. In addition, the elastic member 6 limits displacement of the wheel frame 2 and the wheels 3 from the housing 1 to contact the ground when the air bags are deflated. In this embodiment, the number of the elastic member 6 is four, each elastic member 6 is a spring sleeved on each extension rod 52 and disposed between the enlarged end 51 and the wheel frame 2, both ends of the spring respectively press against corresponding positions of the enlarged end 51 and the wheel frame 2.

In this embodiment, as shown in FIG. 2 and FIG. 7, each air bag 4 is located in a space enclosed by the wheel frame 2 and the mounting groove 13 of the housing 1, and an air pipe 41 for air circulation, which at least partially comes out from the wheel frame 2, is disposed on each air bag 4. The number of the air bags 4 is at least two. In this embodiment, as shown in FIG. 2, there are two air bags 4 which are in strip and disposed in parallel, and disposed respectively on the first frame plate 21 and the second frame plate 22. Specifically, a connector 43, by which the air bag 4 is mounted on the corresponding frame plate of the wheel frame 2, is disposed at both ends of the two air bags 4 respectively. As shown in FIG. 2, each air pipe 41 extends downward, the first frame plate 21 and the second frame plate 22 respectively have a first hole 211 and a second hole 221 for the corresponding air pipe 41 to extend outside; the air pipes 41 of the two air bags 4 are connected with each other by the connecting pipe 42 located at the bottom of the wheel frame 2, the connecting pipe 42 has an air nozzle 45 is capable of communicating with an inflator. In this embodiment, the connecting pipe 42 comprises a first pipe section 421 and a second pipe section 422, the air nozzle 45 is connected to the first pipe section 421 and the second pipe section 422 through an adapter 44, and the housing 1 has a gap 11 for allowing the air nozzle 45 to be exposed.

When the air bags 4 are inflated, the housing 1 is lifted up relative to the wheel frame 2 and the wheels 3 from the ground. When the air bags 4 are deflated, the bottom of the housing 1 is located below the wheels 3 and the wheels 3 can be hidden in the mounting groove 13 of the housing 1.

To support the connecting pipe 42, the wheel frame 2 has a supporting member 23 for supporting the connecting pipe 42 at the bottom of the wheel frame 2. The supporting member 23 varies in shape, which may be U-shaped or L-shaped and may also be in other structural forms. In this embodiment, the supporting member 23 is a U-shaped ring disposed at the bottom of the third frame plate 24, the adapter 44 is located in the U-shaped ring and mounted on a bottom plate 231 of the U-shaped ring by a joint pin, and the air nozzle 45 extends out of the U-shaped ring from inside.

Figure 5:
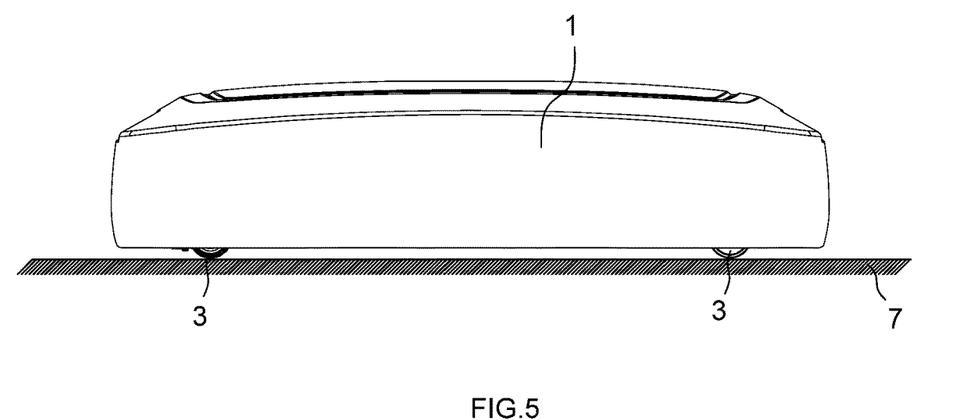
FIG. 5 is a front view of the movable umbrella base according to the embodiment of the present invention (when the wheels partially come out from the housing)
Figure 6:
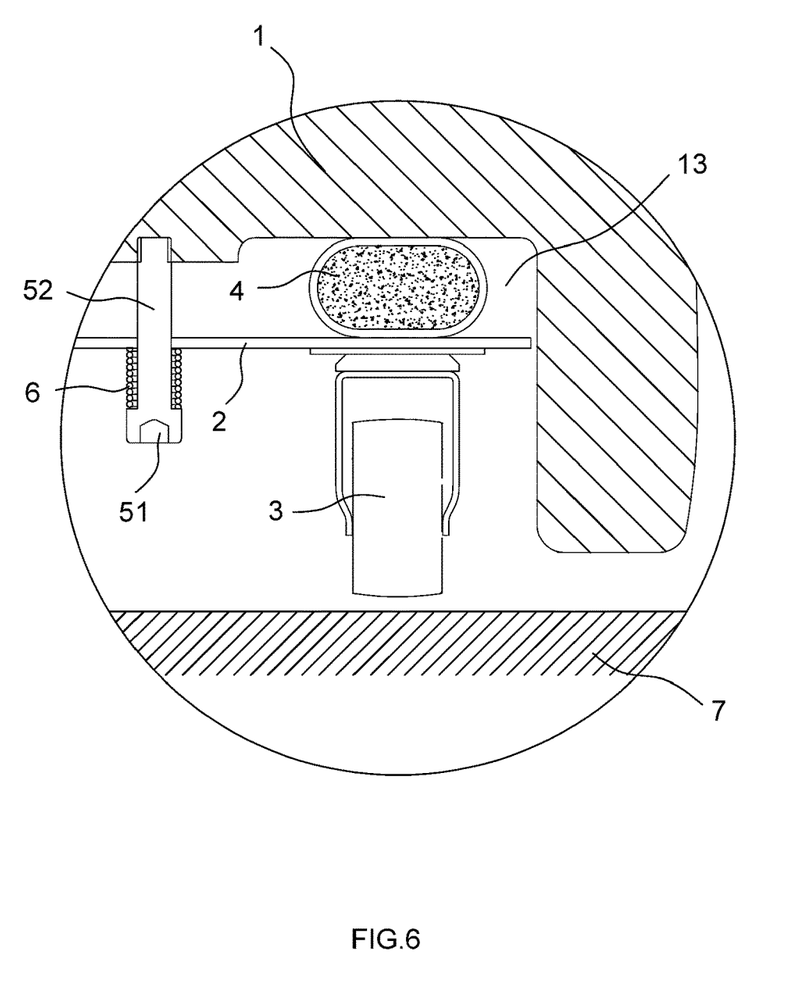
FIG. 6 is a section view of part of FIG. 5.

As shown in FIG. 5 and FIG. 6, when there is a need to move the umbrella base, the external inflator is connected to the air nozzle 45 to inflate the air bags 4 through the air nozzle 45. The inflation of the air bags 4 enables the wheel frame 2 and the wheels 3 to move down synchronously with respect to the housing 1. When the air bags 4 inflate until the bottom of the wheels 3 is located below the housing 1, the inflation stops. In this case, the wheels 3 touch the ground while the housing 1 is off the ground, and the inflator is removed, thus allowing the displacement of the umbrella base.

Figure 3:
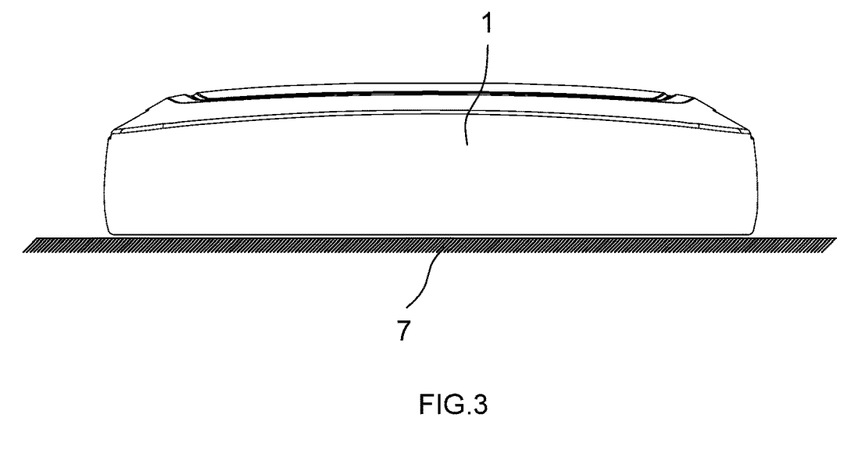
FIG. 3 is a front view of the movable umbrella base according to the embodiment of the present invention (when the wheels are hidden in an housing)
Figure 4:
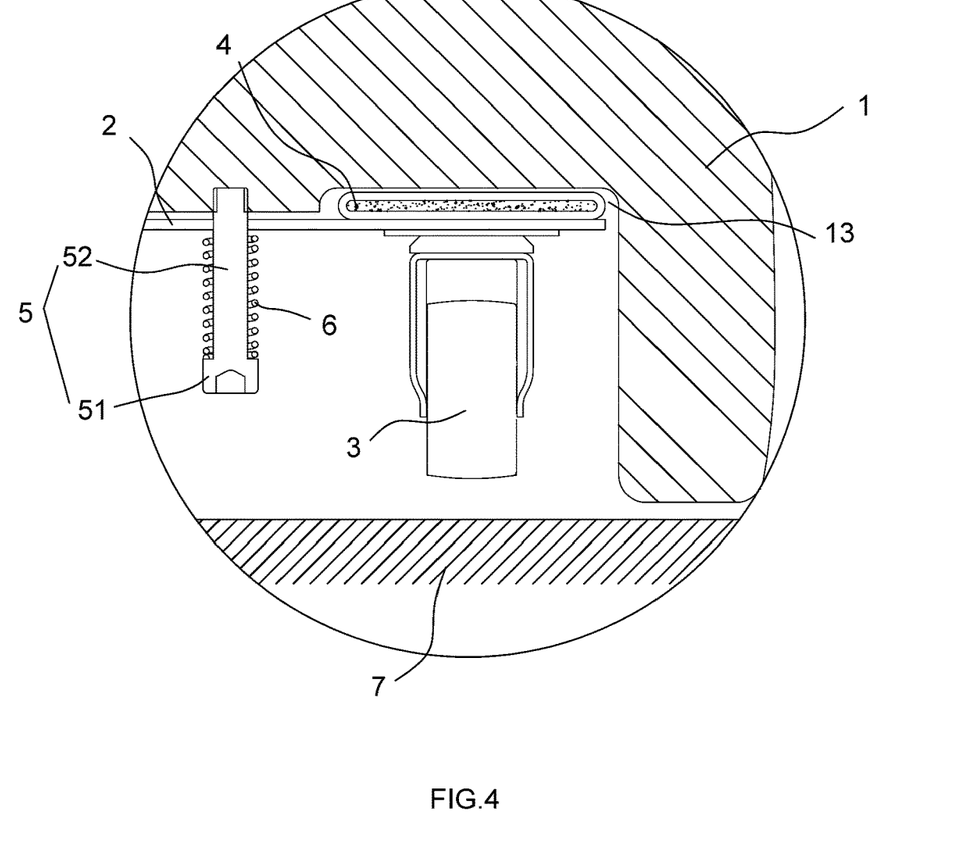
FIG. 4 is a section view of part of FIG. 3.

When the wheels 3 need to be retracted after the umbrella base is moved to a proper position, as shown in FIGS. 3 and 4, the air bags 4 are deflated through the air nozzle 45. During the deflation of the air bags 4, the wheel frame 2 and the wheel 3 move up synchronously with respect to the housing 1 under the elastic recovery of the elastic member 6. When the air bag 4 is deflated to a certain extent, the wheels 3 are hidden in the housing 1, that is., the bottom of the wheels 3 is located above the bottom of the housing 1, and the housing 1 touches the ground. In this case, the wheels 3 are off the ground to fix the umbrella base.

The invention claimed is:

1. A movable umbrella base, comprising:
 a housing (1) having a bottom;
 a wheel frame (2) disposed under the bottom of the housing (1);
 at least three wheels (3) connected at intervals to the wheel frame (2) and the at least three wheels (3) located partially under the wheel frame (2);
 a plurality of air bags (4) located inside a space defined by the wheel frame (2) and the housing (1), each air bag (4) has an air pipe (41) for air circulation, and each air pipe (41) is exposed partially outside the wheel frame (2);
 wherein,
 when the air bags (4) are inflated, the housing (1) is lifted up from the ground relative to the wheel frame (2) and the wheels (3) from the ground;
 when the air bags (4) are deflated, the housing (1) is lowered relative to the wheel frame (2) and the wheels (3) and contacts the ground;
 a plurality of elastic members (6) limit displacement of the wheel frame (2) and the wheels (3) from the housing (1) to contact the ground when the air bags are deflated;
 the number of the plurality of air bags (4) is at least two, the air pipes (41) on the air bags (4) are connected with each other by a connecting pipe (42), and the connecting pipe (42) has an air nozzle (45) for communicating with an external inflator, the air nozzle (45) is exposed outside the wheel frame (2);
 the wheel frame (2) is a quadrilateral frame, and four wheels (3) are disposed at intervals at four corners at the bottom of the wheel frame (2);
 the wheel frame (2) has a first frame plate (21) and a second frame plate (22) and a supporting member (23) for supporting the connecting pipe (42) at the bottom of the wheel frame (2);
 a third frame plate (24) is connected between the first frame plate (21) and the second frame plate (22), the supporting member (23) is a U-shaped ring disposed at the bottom of the third frame plate (24), and the air nozzle (45) extends out of the U-shaped ring from inside;
 two corresponding air bags (4) are disposed in parallel and at intervals, and disposed respectively on the first frame plate (21) and the second frame plate (22);
 each air pipe (41) extends downward, the first frame plate (21) and the second frame plate (22) respectively have a first hole (211) and a second hole (221) for the corresponding air pipe (41) to extend outside;
 the air pipes (41) of the two air bags (4) are connected with each other by the connecting pipe (42) located at the bottom of the wheel frame (2), the connecting pipe (42) has the air nozzle (45), and the housing (1) has a gap (11) for allowing the air nozzle (45) to be exposed.

2. The movable umbrella base of claim 1, wherein the wheel frame (2) and the housing (1) respectively have four mounting holes for receiving four connecting pieces (5) each of which has an extension rod (52);
 the housing (1) has two inner plates (14);
 the extension rod (52) of each connecting piece (5) runs upward through the corresponding mounting hole of the wheel frame (2) and the housing (1), so as to make the wheel frame (2) be mounted on two inner plates (14) of the housing (1).

3. The movable umbrella base of claim 2, wherein each connecting piece (5) has an enlarged end (51) at bottom of the extension rod (52), and the elastic member (6) is a spring sleeved on each extension rod (52) and disposed between the enlarged end (51) and the wheel frame (2).

4. The movable umbrella base of claim 2, wherein each connecting piece (5) is an adjusting bolt, and correspondingly, four threaded holes fitted to the adjusting bolts are disposed on the housing (1).

* * * * *